May 14, 1935.  C. A. ROEDER  2,001,585

HYDRAULIC BRAKE

Filed Aug. 12, 1933   3 Sheets-Sheet 1

Inventor

By C. A. Roeder

Arthur H. Sturges  Attorney

May 14, 1935.  C. A. ROEDER  2,001,585
HYDRAULIC BRAKE
Filed Aug. 12, 1933  3 Sheets-Sheet 3

Inventor
C. A. Roeder
By Arthur H. Sturges
Attorney

Patented May 14, 1935

2,001,585

UNITED STATES PATENT OFFICE 2,001,585

HYDRAULIC BRAKE

Clyde A. Roeder, Omaha, Nebr.

Application August 12, 1933, Serial No. 684,874

1 Claim. (Cl. 188—99)

This invention relates to brakes and has for an object to provide means for applying a braking force to rotating bodies particularly the wheels of moving vehicles including automobiles, airplane landing gear wheels, motorcycles, gun carriages, railroad rolling stock and the like.

Other and further objects and advantages of the invention will be understood from the following detailed description reference being had to the accompanying drawings in which.

Figure 1:
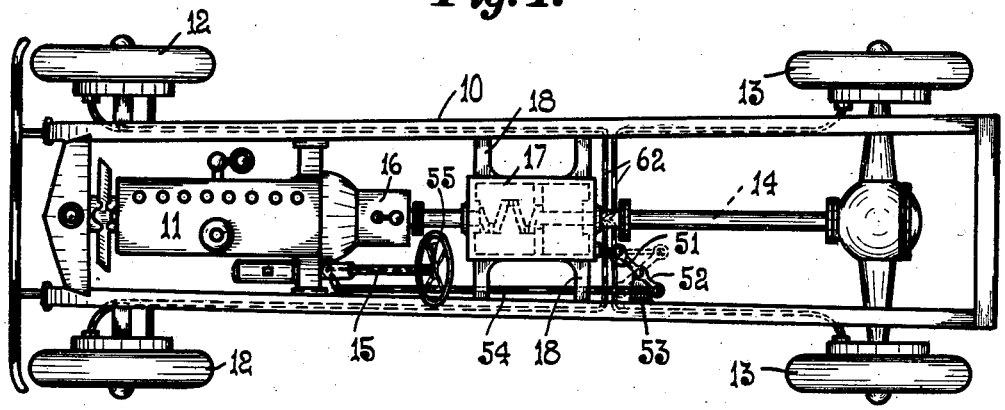
Figure 1 is a top plan view of the chassis of a self-propelled wheel vehicle provided with the braking means of this invention.

In the drawings 10 designates the frame or chassis of a self-propelled vehicle provided with an engine 11, forward steering wheels 12, rear wheels 13, propeller shaft 14, steering mast 15, gear transmission housing 16 and the like conventional parts.

Between the propeller shaft 14 and the gear transmission housing 16 the braking means of the present invention may be positioned and includes a housing 17 which may be supported between the side rails of the frame 10 by means of bracket arms 18.

Figure 2:
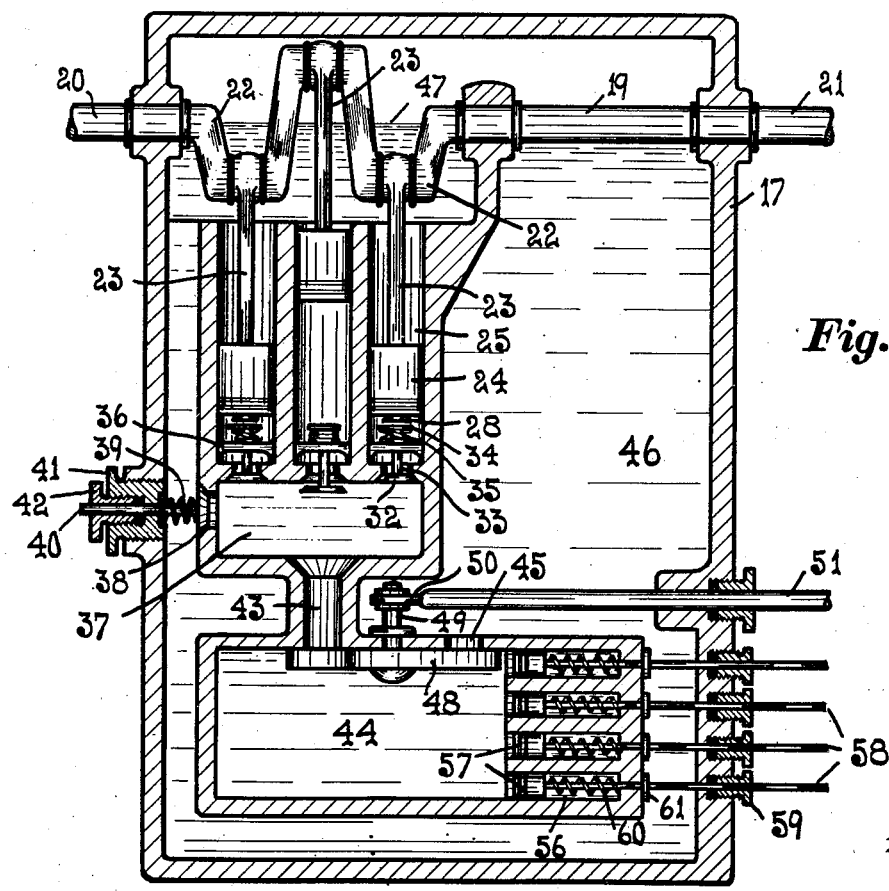
Figure 2 is a vertical section of a brake means housing.

As best shown in Figure 2, a crank shaft 19 is journalled in the walls of the housing 17. The forward end 20 of the crank shaft is adapted to be rotated by the engine 11 at times when the gears within the housing 16 are in mesh, the rear end 21 communicating the motion to the propeller shaft 14.

Figure 6:
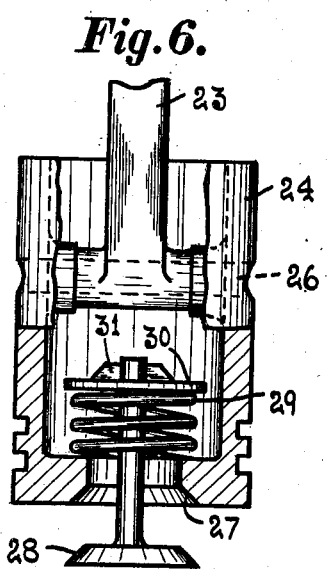
Figure 6 is a side view partly in section of a piston.

The crank shaft 19 is provided with a plurality of crank throws 22 to which connecting rods 23 are journalled. Pistons 24, best shown in Figure 6, are secured to each connecting rod and adapted to have reciprocating movements in their respective cylinders 25. The pistons are secured to the rods by means of wrist pins 26 and are open at their upper ends and provided with valve seats 27 at their lower closable ends which are adapted to be closed by means of valves 28 during down strokes of the pistons and are normally urged to closed positions by means of valve springs 29, the latter being positioned about the stems of the valves and between the heads of the pistons and washers 30 secured to the valve stems by means of pins 31.

The cylinders 25 are open at their upper ends and closed at times at their lower ends by means of cylinder valves 32 having upwardly extending stems 33 provided with valve spring keepers 34 suitably secured to the upper ends of the stems 33 and springs 35 positioned between the keepers 34 and transversely positioned valve stem guides 36 whereby the valves 32 are normally urged to their seats for closing the lower ends of the cylinders during up strokes of the pistons.

The cylinders 25 are adapted to be placed in communication at times when the valves 32 are forced open with a chamber 37 provided with a safety valve 38 which is normally closed against its seat by means of a spring 39, the stem 40 thereof extending outwardly of the housing 17 and provided with an adjusting nut 41 for regulating the tension of the spring 39, a pack nut 42 being employed for preventing leakage of the later described oil.

The bottom of the chamber 37 is provided with an oil outlet port 43 through which communication is established at times with a sump 44, the latter being provided with an outlet port 45 for a communication at times with the reservoir 46 and it will be understood that the reservoir, the sump, the chamber and cylinder contain oil, or the like media, the preferred level thereof being indicated at 47 in substantial alignment with the crank shaft 19.

Figure 3:
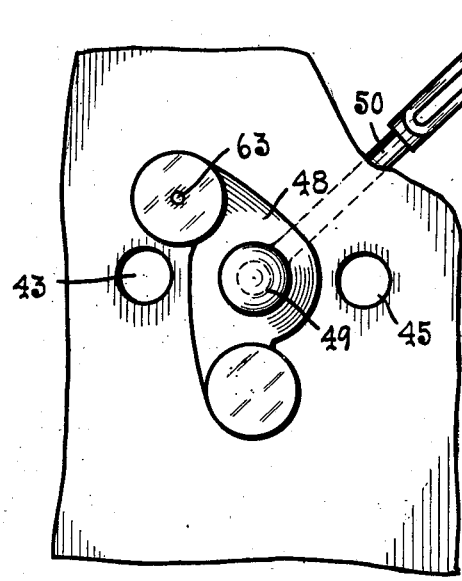
Figures 3, 4 and 5 are plan views of a valve employed and showing the valve in various positions of adjustment.

The ports 43 and 45 are adapted to be opened and closed by means of a swingable valve 48 having a shaft 49 journalled through a wall of the sump 44, the said shaft being provided, as best shown in Figure 3, with a swingable arm 50 adapted to be moved by means of a rod 51, the latter extending through the side of the housing 17 and pivotally connected, as shown in Figure 1, to a bell-crank lever 52, the latter being pivotally supported upon a bracket arm 53 carried by the frame of the vehicle. The lever 52 is pivotally connected to a push and pull rod 54 which extends to the steering mast 15 of the vehicle and is adapted to be actuated by means of a control lever 55 positioned adjacent the steering wheel of the vehicle.

The sump housing is provided with a plurality of sump cylinders 56 having pistons 57 adapted to reciprocate in the cylinders, the pistons being connected to brake rods 58 which extend through the housing 17 and provided with pack nuts 59 for preventing leakage of oil. The springs 60 are provided for returning the rods to a normal position, stops 61 carried by the rods to prevent too great an inward movement of the rods and sump pistons.

It will be understood that the rods 58 are in operative communication with transversely positioned shafts 62, the latter being so arranged that motion may be communicated to the brake shoes of the vehicle wheels in a well-known manner as shown generally by the dotted lines in Figure 1.

Figure 7:
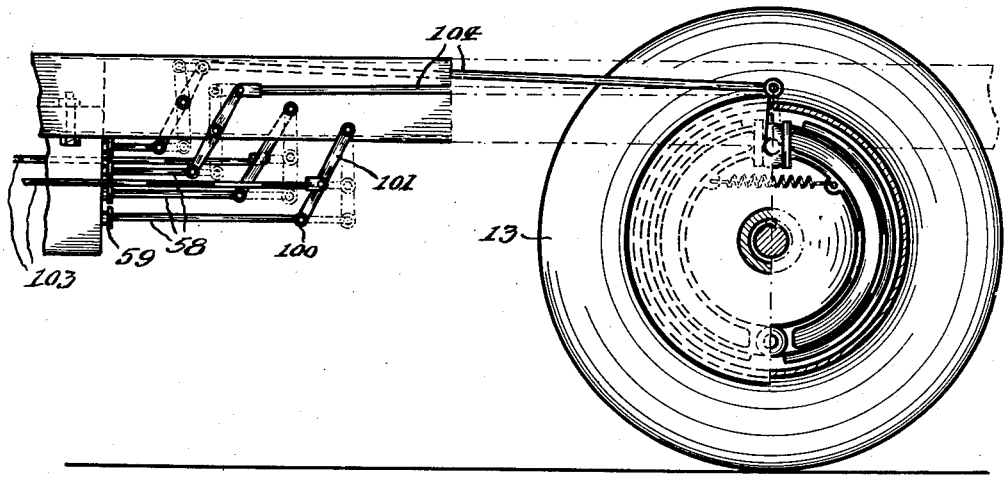
Figure 7 is a side view of the portion of a vehicle chassis disclosing the actuating rod means for the brakes taken along 7—7 of Figure 8.
Figure 8:
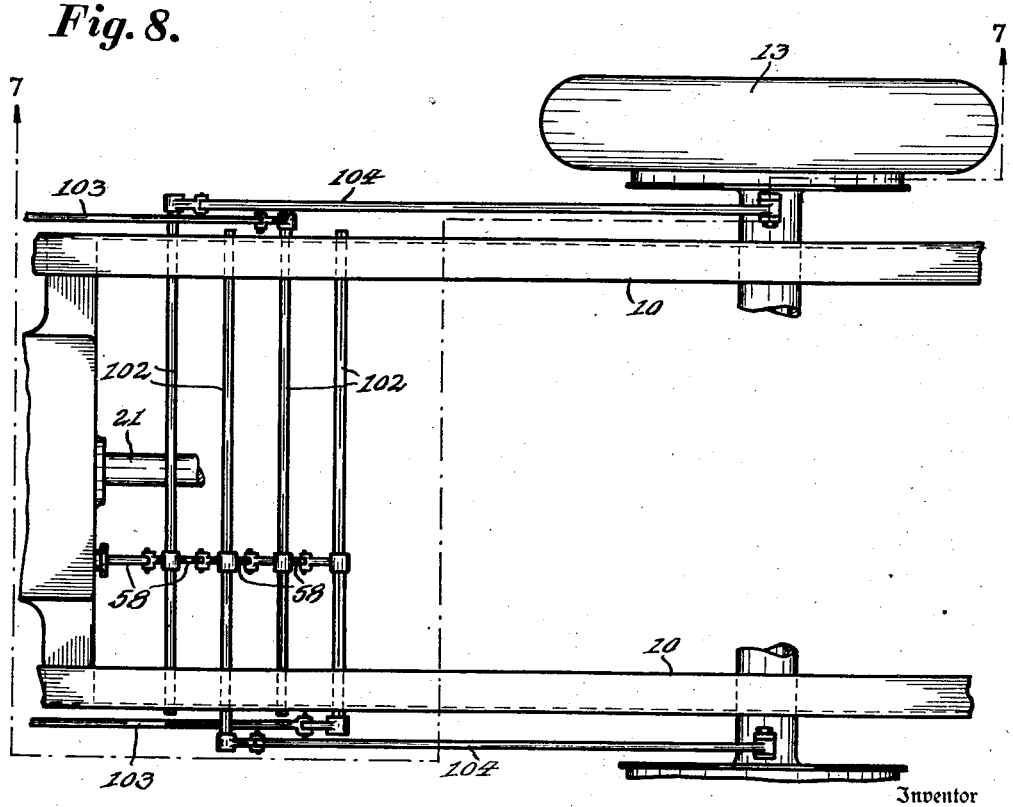
Figure 8 is a top plan view of Figure 7.

The rods 58 are disclosed in Figure 2 as broken off, the continuing ends being shown in Figures 7 and 8, and are secured in each instance as at 100 to levers 101, which are pivotally mounted upon transversely disposed carrier rods 102 arranged for rotation and extending transversely of, and supported by and between the side rails of the chassis frame.

The rods 103 extend to the front wheels of the vehicle and are pivotally secured to the levers 101 midway between their ends, whereas the rods 104, which extend to the rear wheels, are so arranged that they are pivotally secured to the upper ends of their levers 101 for reversing the direction of travel with respect to the rods 103.

In operation during the normal travel of the vehicle when no braking force is required the motion imparted to the crank shaft of the engine will drive the vehicle through the crank shaft 19 of the present invention and the propeller shaft 14 of the vehicle, the motion being communicated to the rear wheels in a well known manner. At this time the pistons 24 reciprocate not applying a braking force to the crank shaft 19. During up strokes of the pistons, oil within the cylinders passes from one side of the pistons to the other through the valve seats 27 and during down strokes of the pistons the oil is forced from the cylinders past the cylinder valves 32 into the chamber 37 and from there to the sump 44, it being understood that at this time the swingable valve 48 is in the position shown in Figure 3 whereby the oil is idly pumped from the chamber into the sump and back to the reservoir.

Figure 4:
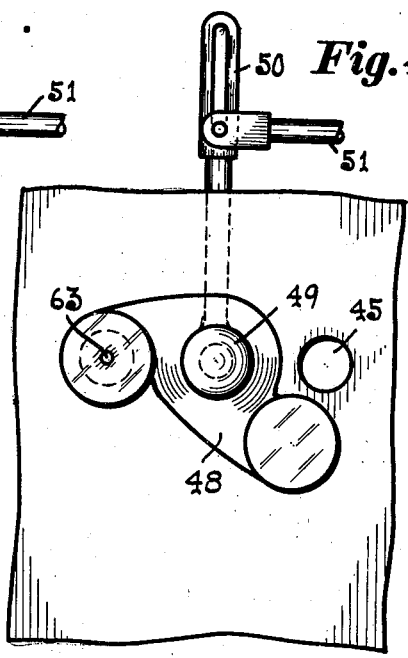

When it is desired to apply a braking force to the shaft 19 the operator causes the swingable valve 48 to be moved into the position shown in Figure 4 whereby the outlet port 43 of the chamber 37 is completely closed, except for a relief aperture 63 formed through the swingable valve 48 being in register with the port 43 and it will be noted that when the port 43 is closed that during down strokes of the pistons 24 the oil within the cylinders 25 will resist said downward movement, thereby applying a braking force to the shaft 19, any undue amount of pressure being relieved by means of the safety valve 38 which permits a communication between the reservoir 46 and the chamber 37 in accordance with the tension or adjustment of the safety valve spring 39. During up strokes of the pistons 24 the cylinder valves 32 close and the piston valves 28 open permitting a passage of oil from one side of the pistons 24 to the other for use during a down stroke thereof.

Figure 5:
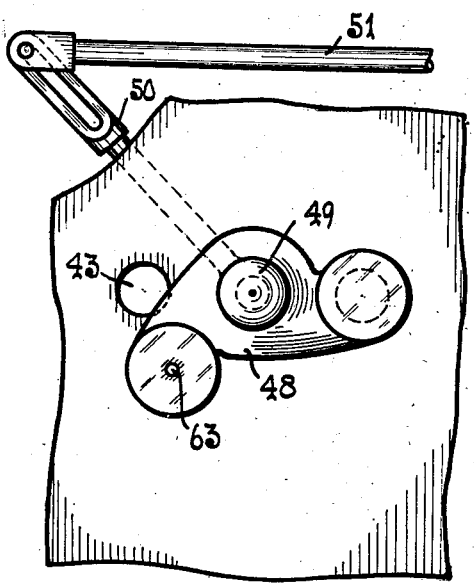

At times when it is desired to apply a braking force to the brake mechanism of the wheels 13 through the brake rods 58 and their connections the swingable valve 48 is moved into the position shown in Figure 5 whereby the oil outlet port 43 is open permitting a communication of pressure between the sump 44 and the chamber 37 and preventing a communication of oil from the sump 44 to the reservoir 46 except should too great a pressure be applied to the brake pistons 57 which, in such cases, is relieved by means of the safety valve 38 as above explained.

It will be noted that the arrangement of the swingable valve 48 is such that the ports 43 and 45 cannot be simultaneously closed at any time.

For coasting down a hill the swingable valve is positioned as shown in Figure 4 for preventing the application of pressure within the sump 44, the pressure within the chamber 37 alone being used.

For stopping the car in emergencies or at desired times or when a greater amount of braking force is desired the swingable valve is positioned as shown in Figure 5 whereby the pistons 57 and the pressure within the sump 44 is also used for applying a braking force to the brake shoes of the vehicle. It will be noted that during coasting down grades the braking force may be applied to the propeller shaft 14 only and from there to the rear wheels through the differential gear and rear axle of the vehicle.

From the foregoing description it is thought to be obvious that a braking mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish it to be understood as limiting myself to the precise arrangement and formation of the several parts herein shown in carrying out my invention in practice except as claimed.

I claim:—

A hydraulic brake for motor vehicles and the like comprising a fluid containing housing positioned between the motor and the propeller shaft of the vehicle, a crank shaft journalled in said housing and drivingly connected between said motor and propeller shaft, a cylinder carried by the housing, a piston mounted in the cylinder and adapted to be reciprocated by the crank shaft, a chamber carried by the housing and communicating with an end of the cylinder, a reservoir carried by the housing and in communication with said chamber and the other end of said cylinder, said piston provided with a valve adapted to close during the pressure stroke, a valve located between the cylinder and the said chamber adapted to open during the said pressure stroke, a manually operable valve between the chamber and reservoir for increasing pressure in the chamber and cylinder to brake the propeller shaft of the vehicle, and a safety valve situated between the chamber and the reservoir to relieve excessive pressure.

CLYDE A. ROEDER.